(12) United States Patent
Ueda et al.

(10) Patent No.: US 9,043,092 B2
(45) Date of Patent: May 26, 2015

(54) VEHICLE CONTROL APPARATUS

(71) Applicants: DENSO CORPORATION, Kariya, Aichi-pref. (JP); Nippon Soken, Inc., Nishio, Aichi-pref. (JP)

(72) Inventors: Yusuke Ueda, Nishio (JP); Motonori Tominaga, Anjo (JP); Tomohiko Tsuruta, Aichi-ken (JP); Takeshi Hatoh, Nagoya (JP)

(73) Assignees: Nippon Soken, Inc., Nishio (JP); DENSO CORPORATION, Kariya (JP)

( * ) Notice: Subject to any disclaimer, the term of this patent is extended or adjusted under 35 U.S.C. 154(b) by 79 days.

(21) Appl. No.: 13/777,037

(22) Filed: Feb. 26, 2013

(65) Prior Publication Data

US 2013/0226406 A1    Aug. 29, 2013

(30) Foreign Application Priority Data

Feb. 28, 2012   (JP) ................... 2012-041823

(51) Int. Cl.
*B62D 6/00*  (2006.01)
*G05D 1/02*  (2006.01)
*B62D 1/28*  (2006.01)
*B62D 15/02* (2006.01)

(52) U.S. Cl.
CPC ............... *B62D 6/001* (2013.01); *G05D 1/021* (2013.01); *B62D 1/28* (2013.01); *B62D 15/0265* (2013.01)

(58) Field of Classification Search
CPC ... B60W 30/10; B60W 30/12; B60W 30/165; B62D 15/025; B62D 15/0255; B62D 15/026; B62D 15/0265
USPC ............... 701/41, 42, 43, 44, 93, 96
See application file for complete search history.

(56) References Cited

U.S. PATENT DOCUMENTS

| | | | | |
|---|---|---|---|---|
| 5,765,116 | A * | 6/1998 | Wilson-Jones et al. | 701/41 |
| 6,185,492 | B1 * | 2/2001 | Kagawa et al. | 701/41 |
| 2004/0262063 | A1 * | 12/2004 | Kaufmann et al. | 180/169 |
| 2005/0137774 | A1 * | 6/2005 | Rupp | 701/96 |
| 2006/0085131 | A1 * | 4/2006 | Yopp et al. | 701/301 |
| 2013/0197758 | A1 | 8/2013 | Ueda et al. | |

FOREIGN PATENT DOCUMENTS

| | | |
|---|---|---|
| JP | 2000-251171 | 9/2000 |
| JP | 2007-022134 | 2/2007 |
| JP | 2013-154710 | 8/2013 |

* cited by examiner

*Primary Examiner* — Stephen Holwerda
(74) *Attorney, Agent, or Firm* — Harness, Dickey & Pierce, PLC

(57) ABSTRACT

A vehicle control apparatus capable of automatic steering control while reducing discomfort or stress on vehicle occupants. In the apparatus, a lane detection unit detects a lane in which the vehicle is traveling. An offset setting unit sets an offset within the lane suitable for making a driver feel less stressed. An occupant detection unit detects the presence of a designated occupant of a seat opposite a driver's seat. An offset adjustment unit, when the designated occupant is detected, adjusts the offset set by the offset setting unit to be decreased. A vehicle-path estimation unit estimates a vehicle path in the lane such that the vehicle can travel along the vehicle path from a current lateral position to a target lateral position of the vehicle. An automatic steering control unit automatically controls steering so that the vehicle travels along the estimated vehicle.

13 Claims, 15 Drawing Sheets

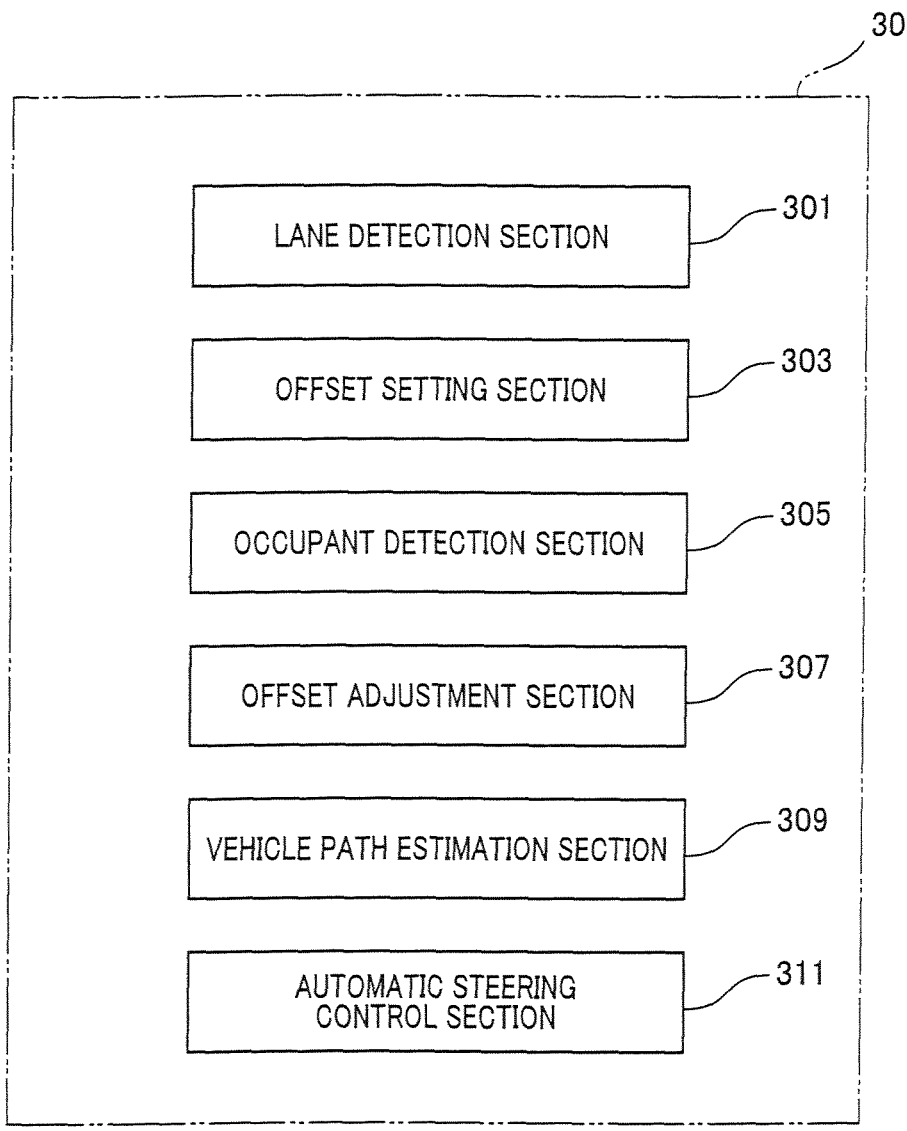

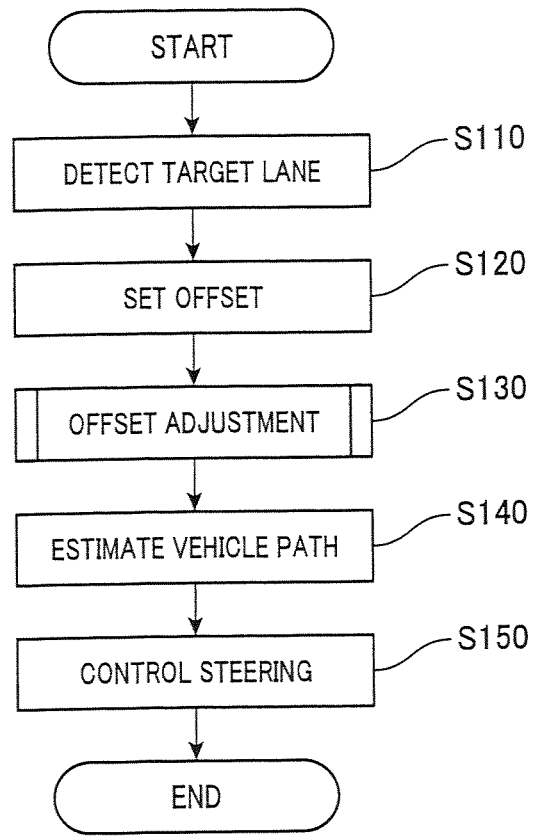
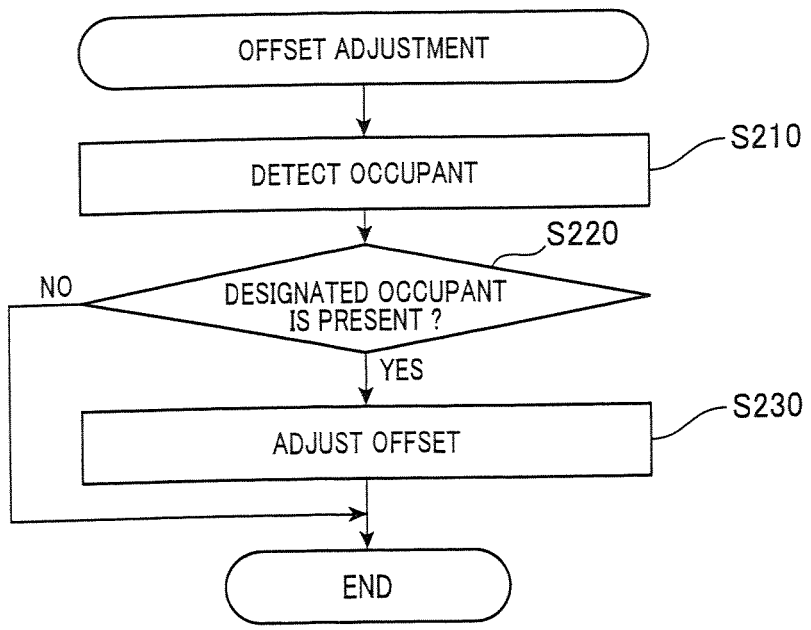

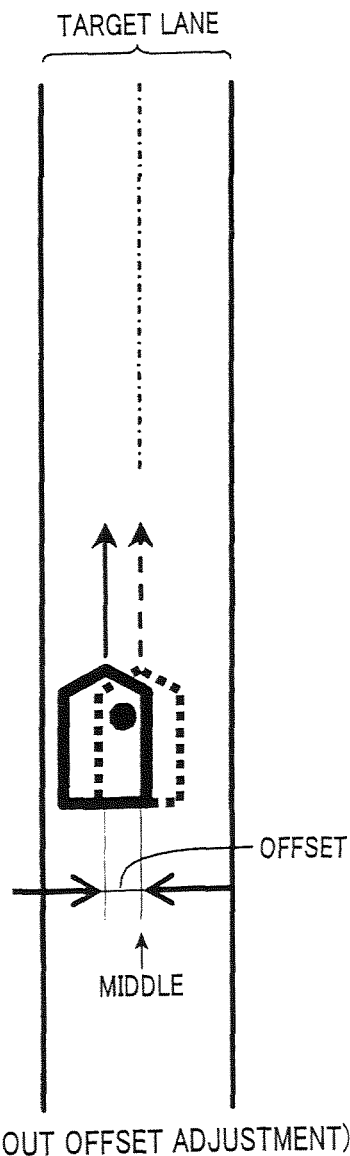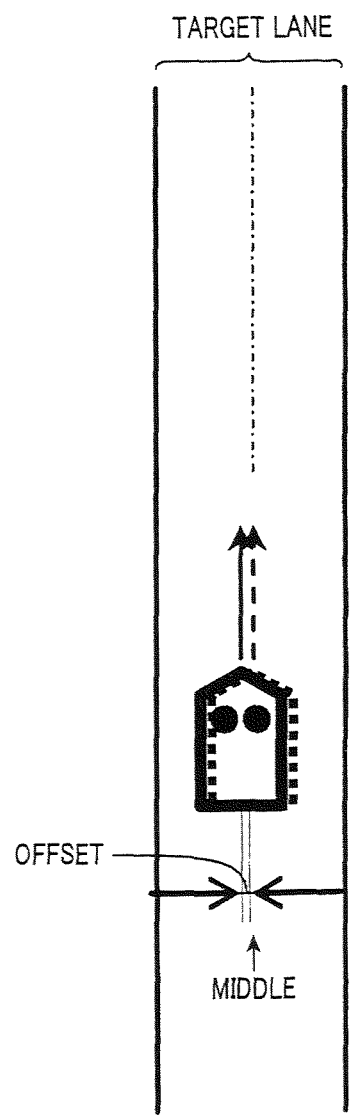

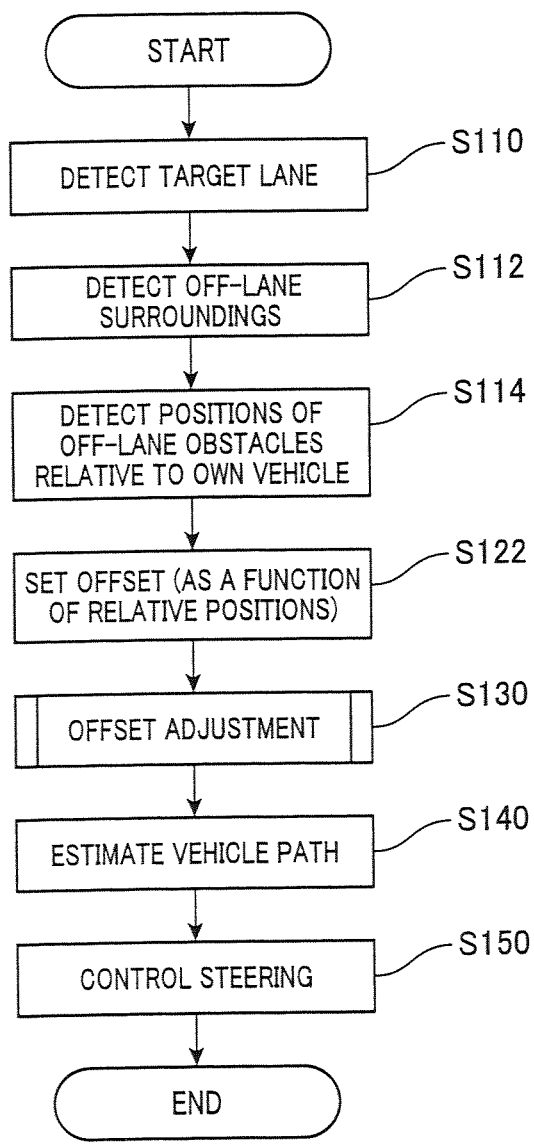

(WITHOUT OFFSET ADJUSTMENT)

(WITH OFFSET ADJUSTMENT)

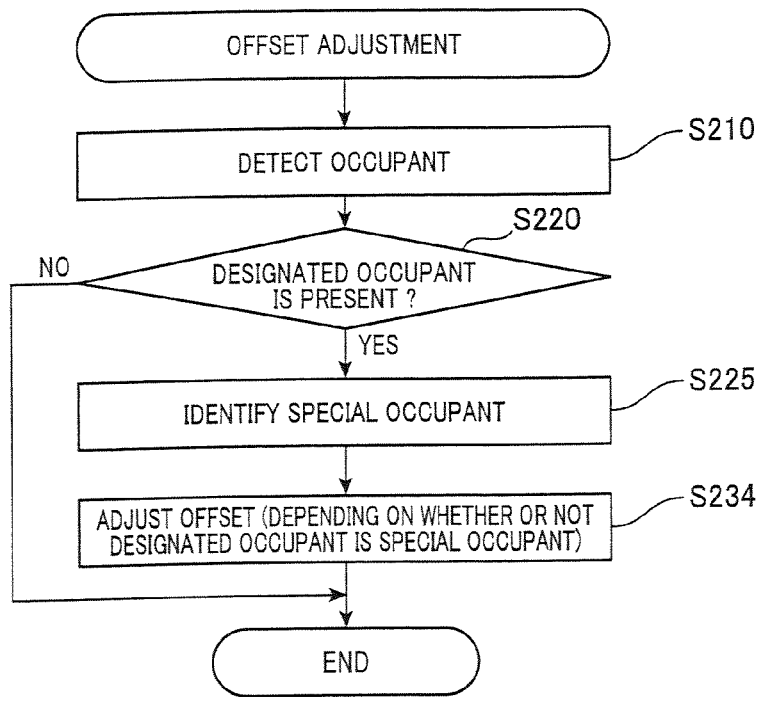
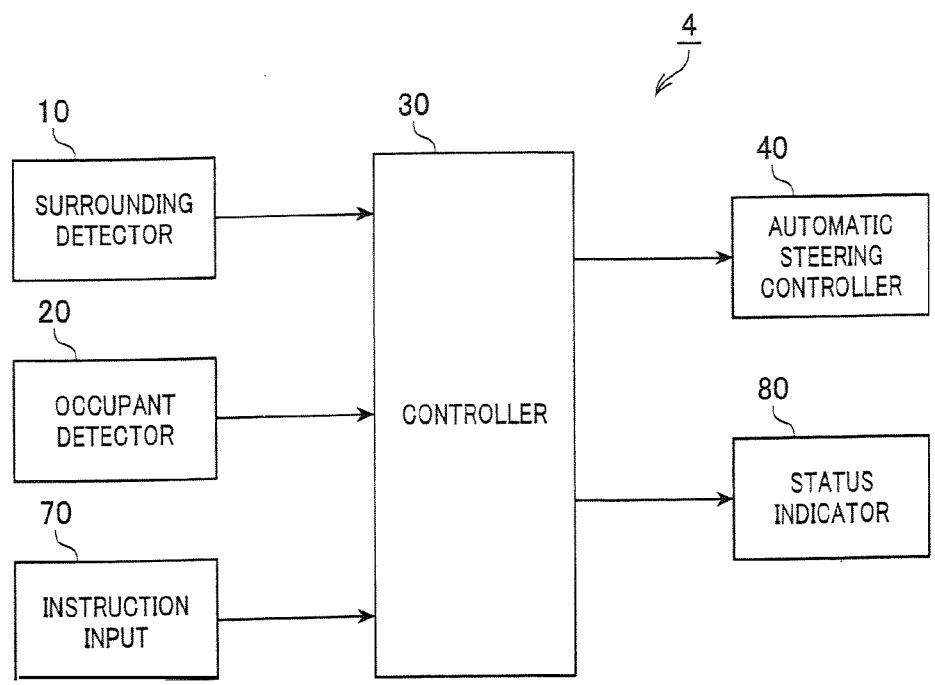

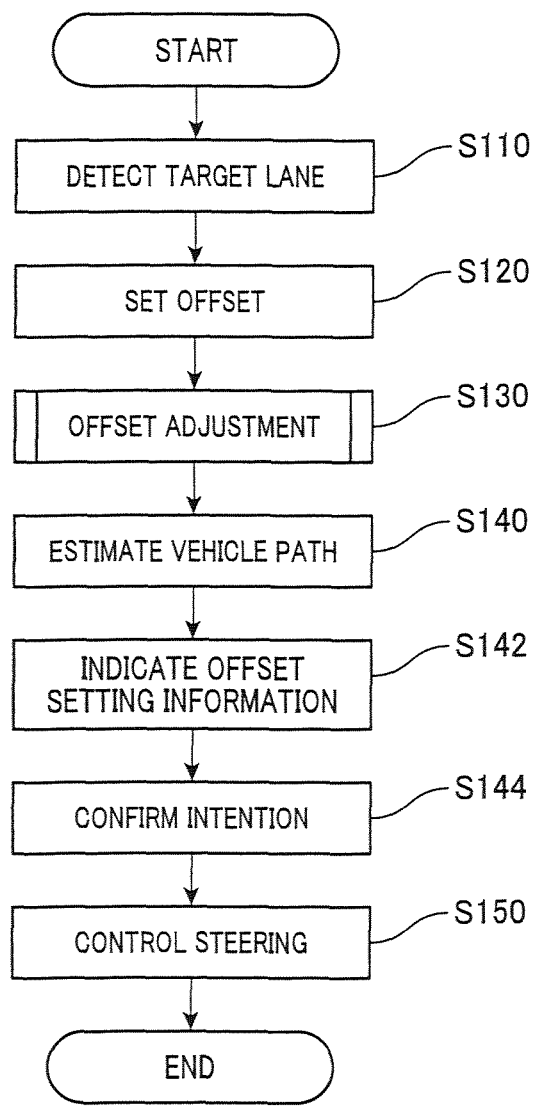

VEHICLE CONTROL APPARATUS

CROSS-REFERENCE TO RELATED APPLICATION

This application is based on and claims the benefit of priority from earlier Japanese Patent Application No. 2012-41823 filed Feb. 28, 2012, the description of which is incorporated herein by reference.

BACKGROUND

1. Technical Field

The present invention relates to a vehicle control apparatus for automatic steering control.

2. Related Art

A known vehicle control apparatus capable of automatic steering control, as disclosed in Japanese Patent Application Laid-Open Publication No. 2007-22134, detects white lines from a captured image forward of or behind a vehicle mounting the apparatus therein (also referred to as the own vehicle) and performs the automatic steering control such that the vehicle keeps traveling near the middle of a lane bordered by the detected white lines. When a white line having a sequence of protruding objects thereon serving as a lane separator is detected, the steering is controlled so that the vehicle travels in the lane while keeping an intended lateral position of the vehicle along the lane width direction offset farther away from the white line as compared to cases where no such white lines are detected.

With this configuration, however, since the intended lateral position of the vehicle is offset away from the protruding objects (regarded as obstacles) regardless of the presence of an occupant sitting in a front passenger seat or the like, a vehicle traveling in a lane adjacent to the own lane (the lane in which the own vehicle is traveling) on the front passenger seat side, or an obstacle, such as a wall, approaching the front passenger seat, may make the occupant sitting in the front passenger seat feel uncomfortable or stressed.

In consideration of the foregoing, it would therefore be desirable to have a vehicle control apparatus for automatic steering control of a vehicle, which can reduce discomfort or stress on occupants.

SUMMARY

In accordance with an exemplary embodiment of the present invention, there is provided a vehicle control apparatus mounted in a vehicle. In the apparatus, a lane detection unit detects a lane in which the vehicle is driven to travel. An offset setting unit sets an offset suitable for making a driver of the vehicle feel less stressed, where the offset is a deviation of a lateral position of the vehicle from the middle position of the lane along the lane width direction, and the lateral position of the vehicle is the middle position of the vehicle along the vehicle width direction. An occupant detection unit detects the presence of a designated occupant in the vehicle other than the driver, where the designated occupant is an occupant sitting in a seat laterally opposite a driver's seat. An offset adjustment unit, when the designated occupant is detected by the occupant detection unit, adjusts the offset set by the offset setting unit to be decreased.

In addition, in the apparatus, a vehicle-path estimation unit estimates a vehicle path in the lane such that the vehicle can travel along the vehicle path from a current lateral position to a target lateral position of the vehicle, where the target lateral position of the vehicle is a lateral position offset from the middle position of the lane by the offset set by the offset setting unit or by the offset adjusted by the offset adjustment unit. An automatic steering control unit automatically controls steering so that the vehicle travels along the vehicle path estimated by the vehicle-path estimation unit.

In the vehicle control apparatus as configured as above, when the designated occupant is detected, the offset is decreased. This can reduce discomfort or stress on the designated occupant.

Preferably, in the apparatus, an occupant-state detection unit determines whether or not the designated occupant is sleeping. An inhibition unit, when it is determined by the occupant-state detection unit that the designated occupant is sleeping, inhibits the offset adjustment unit from adjusting the offset set by the offset setting unit. This is because, even in the presence of the designated occupant, the sleeping designated occupant will not feel uncomfortable or stressed.

Preferably, in the apparatus, an eye level estimation unit estimates an eye level of occupants of the vehicle from vehicle information about a height of the vehicle. The offset adjustment unit adjusts the offset set by the offset setting unit to be decreased with a lowering eye level estimated by the eye level estimation unit.

Since, in general, each occupant feels more uncomfortable or stressed as his/her eye level is lowered even though the surroundings around the vehicle are the same, the offset is adjusted as a function of his/her eye level. This allows the automatic steering control to be achieved properly.

Preferably, in the apparatus, a special-occupant detection unit determines whether or not the designated occupant is a predetermined special occupant. The offset adjustment unit is configured to, when it is determined by the special-occupant detection unit that the designated occupant is the predetermined special occupant, adjust the offset set by the offset setting unit to be decreased as compared to cases where the designated occupant is not the predetermined special occupant.

This allows the automatic steering control to be achieved properly for the special occupant, that is, an occupant on which discomfort or stress needs to be reduced significantly.

Preferably, in the apparatus, an obstacle detection unit detects an off-lane obstacle, where the off-lane obstacle is an obstacle outside the lane and the offset setting unit is configured to set the offset in response to a detection result of the obstacle detection unit.

This allows the offset to be adjusted properly depending on situations outside the lane, such as positions of off-lane obstacles relative to the vehicle, varying with time.

Preferably, in the apparatus, a status indication unit indicates to occupants of the vehicle at least one of an offset adjustment result of the offset adjustment unit and a vehicle path estimation of the vehicle-path estimation unit. This allows the occupant to be aware that the offset has been changed due to the presence of the designated occupant or a change in state of the designated occupant.

Preferably, in the apparatus, an instruction reception unit receives an instruction of whether to employ an offset adjustment result of the offset adjustment unit. The vehicle-path estimation unit is configured to change the offset used to estimate the vehicle path in accordance with the instruction received via the instruction reception unit. This allows whether or not the offset has to be changed to be determined by the occupant, which can prevent unnecessary steering control from being performed.

BRIEF DESCRIPTION OF THE DRAWINGS

In the accompanying drawings:

FIG. 3A shows a schematic diagram of a controller of the vehicle control apparatus of the first embodiment;

FIG. 3B shows a flowchart of a lane keeping control process of the first embodiment;

FIG. 4 shows a flowchart of an offset adjustment process of the first embodiment;

FIG. 5A shows an example of an offset in the absence of a designated occupant in accordance with the first embodiment;

FIG. 5B shows an example of an offset in the presence of the designated occupant in accordance with the first embodiment;

FIG. 6B shows a flowchart of a lane keeping control process of the second embodiment;

FIG. 11B shows a flowchart of an offset adjustment process of the fourth embodiment;

FIG. 12 shows a schematic block diagram of a vehicle control apparatus in accordance with a fifth embodiment of the present invention;

FIG. 13B shows a flowchart of an offset adjustment process of the fourth embodiment.

DESCRIPTION OF SPECIFIC EMBODIMENTS

The present inventions will be described more fully hereinafter with reference to the accompanying drawings. Like numbers refer to like elements throughout.

First Embodiment (Overall Configuration)

Figure 1:
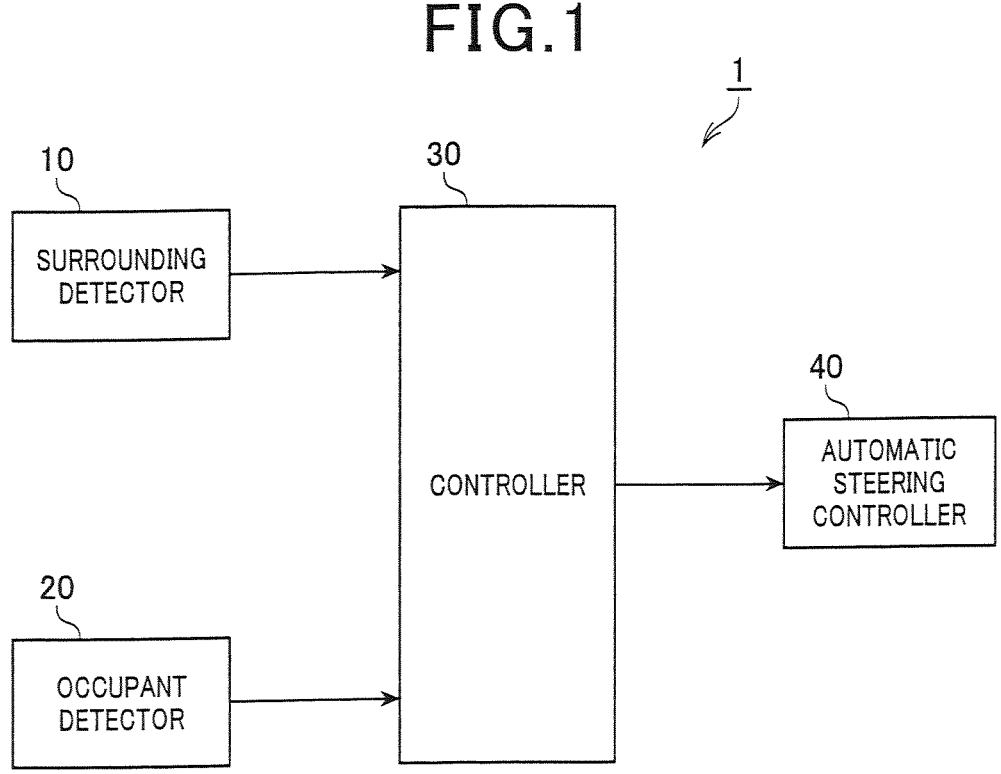
FIG. 1 shows a schematic block diagram of a vehicle control apparatus in accordance with first or second embodiment of the present invention.

A vehicle control apparatus 1 in accordance with a first embodiment of the present embodiment, as shown in FIG. 1, includes a surrounding detector 10 that detects surroundings around the own vehicle (i.e., the vehicle mounting the apparatus therein), an occupant detector 20 that detects the presence of occupants other than a driver, a controller 30 that estimates a desired vehicle path on the basis of detection results of the surrounding detector 10 and the occupant detector 20 and generates a steering instruction for driving the own vehicle along the estimated vehicle path, and an automatic steering controller 40 that automatically controls steering in response to the steering instruction from the controller 30.

Figure 2:
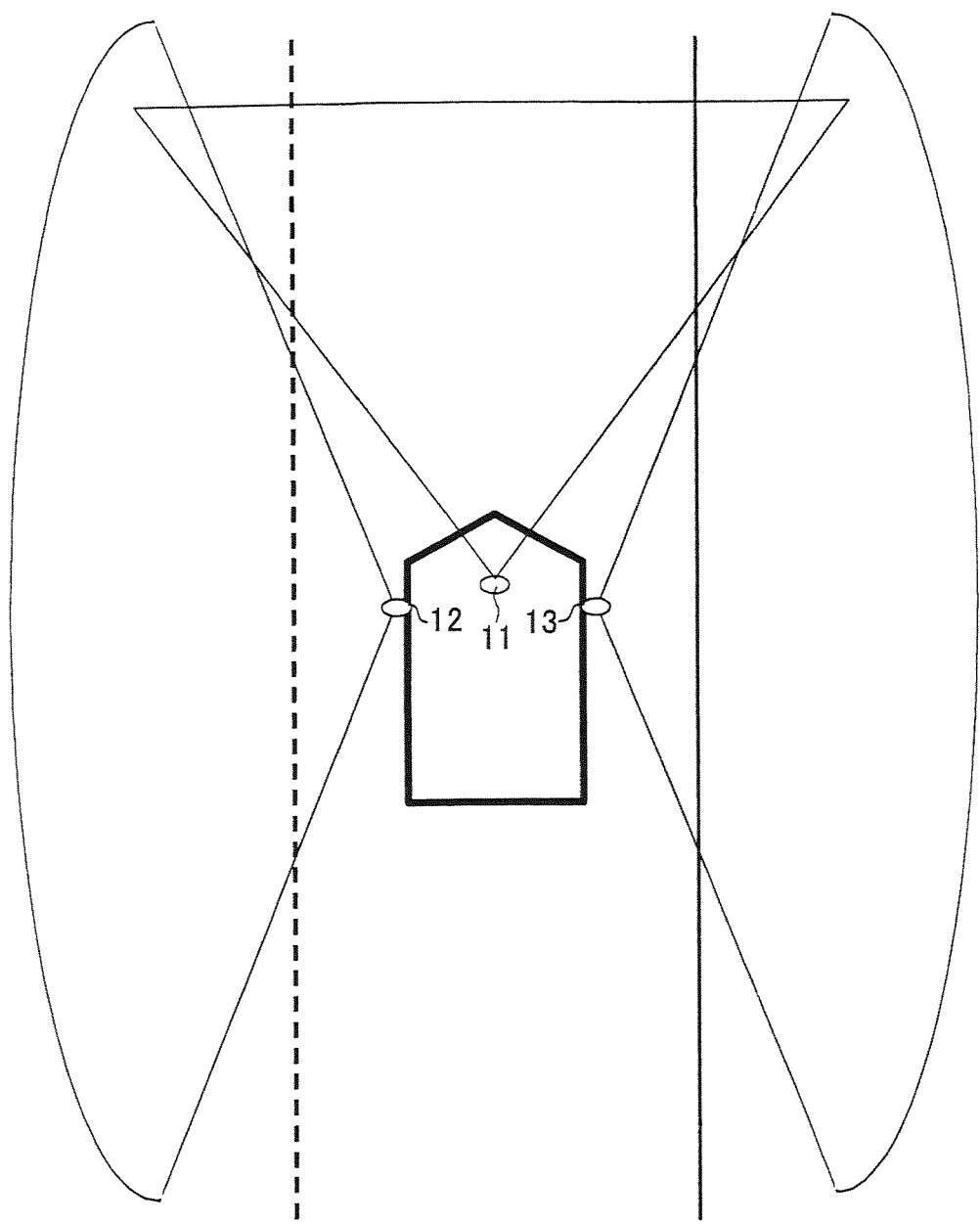
FIG. 2 shows a surrounding detector and its detection areas.

As shown in FIG. 2, the surrounding detector 10 includes at least a forward sensor 11 that detects surroundings in a forward area, encompassing a first predetermined angle range, centered on the direction of travel of the own vehicle, a left side sensor 12 that detects surroundings in a detection area on the left side of the own vehicle, encompassing a second predetermined angle range, centered on the vehicle-width direction, a right side sensor 13 that detects surroundings in a detection area on the right side of the own vehicle, encompassing a third predetermined angle range, centered on the vehicle-width direction. In the present embodiment, the second and third predetermined angle ranges may be equal to each other.

The forward sensor 11 includes an image sensor (in the form of a camera) or a laser radar device. Each of the left and right side sensors 12, 13 includes one of an image sensor, a radar sensor, a millimeter wave sensor, and a sonar device.

The occupant detector 20 is well-known and detects the presence of an occupant of each seat (other than a driver's seat) from a load applied to the seat. The occupant detector 20 may detect the presence of an occupant of each seat from a change in electrostatic capacitance between the seat and a human body, an image of the interior of a passenger compartment or the like. In the present embodiment, the occupant detector 20 can detect at least the presence of an occupant of a front passenger seat. The occupant of the front passenger seat will hereinafter be referred to as a designated occupant.

The automatic steering controller 40 is well-known and controls steering according to the steering instruction, which will not be explained in detail here.

The controller 30, which is a microcomputer configured around a central processing unit (CPU), a read-only memory (ROM), a random access memory (RAM), performs at least a lane keeping control process, in which the steering is controlled automatically so that the lane in which the own vehicle is traveling is maintained, thereby reducing a driving load of the driver.

The controller 30, as shown in 3A, includes a lane detection section 301, an offset setting section 303, an occupant detection section 305, an offset adjustment section 307, a vehicle path estimation section 309, and an automatic steering control section 311. Operations of these sections will be described later in more detail.

(Lane Keeping Control)

The lane keeping control process will now be explained with reference to a flowchart of FIG. 3B. This process is initiated when a start switch is operated, and is performed in the controller 30 repeatedly every predetermined time interval until a prescribed override condition, such as an engine shutdown or activation of a release switch or the like, is fulfilled.

First, in step S110, a traffic lane in which the own vehicle is driven to travel (referred to as a target lane) is detected on the basis of a detection result of the forward sensor 11.

More specifically, traffic lane lines, such as white and yellow lines, marked on a roadway (including, but are not limited to, a roadway middle line, a roadway boundary, a lane boundary and the like) are detected by using at least the detection result of the forward sensor 11. The lane in which the own vehicle is presently traveling is determined on the basis of the detected traffic lane lines. The determined lane is assumed to be a target lane.

When a portion of an obstacle, such as a parked vehicle, protrudes into the target lane, the outline of the obstacle portion may be regarded as a portion of a boundary of the target lane. In addition, in the absence of traffic lane lines marked on the roadway, the target lane may be defined by locations of a guardrail, a side ditch, constructions, such as a fence, and others. When the road way is a mountain road, the target lane may be defined by locations of cliffs.

In step S120, an offset, which is a deviation of a lateral position of the own vehicle (the middle position of the own vehicle along the vehicle width direction) from the middle position of the target lane along the lane width direction, is set on the basis of a target lane width and a vehicle width so as to reduce stress on the driver of the vehicle.

More specifically, in step S120, the offset is set such that a position of the driver along the lane width direction is as close to the middle position of the target lane along the lane width direction as possible so as to ensure a minimum required space or distance between the own vehicle and the front passenger seat side lane line (or lane demarcation).

In step S130, an offset adjustment process is performed, where the offset set in step S120 is adjusted properly as a function of a situation in the own vehicle (e.g., the presence or absence of a designated occupant).

In step S140, a desired vehicle path is estimated such that the own vehicle is allowed to travel along the vehicle path from the current lateral position to a target lateral position of the own vehicle. The target lateral position of the own vehicle is defined by the middle position of the target lane along the lane width direction and the offset set in step S120 or adjusted in step S130.

Finally, in step S150, a steering control variable required to drive the own vehicle along the vehicle path estimated in step S140 is calculated, which is in turn outputted to the automatic steering controller 40 as a steering instruction. The process is then ended.

(Offset Adjustment Process)

The offset adjustment process in step S130 will now be explained with reference to a flowchart of FIG. 4.

First, in step 210, it is determined for each seat whether or not an occupant sitting in the seat is present, from a detection result of the occupant detector 20.

Subsequently, in step S220, it is determined whether or not a designated occupant is present. If it is determined in step S220 that the designated occupant is not present, then the process is ended.

If it is determined in step S220 that the designated occupant is present, then the offset is adjusted so as to reduce discomfort or stress on the designated occupant. Thereafter, the process is ended.

More specifically, the offset adjustment may be achieved by multiplying the offset set in step S120 by a predetermined coefficient K (where 0<K<1) or by setting the offset to zero.

(Operations)

In the vehicle control apparatus 1 configured as above, when the designated occupant (that is an occupant of the front passenger seat in the present embodiment) is absent, the offset, as shown in FIG. 5A, is set such that the position of the driver is in the vicinity of the middle position of the target lane. When the designated occupant is present, the offset, as shown in FIG. 5B, is adjusted such that the offset is reduced as compared to the offset when the designated occupant is absent. In other words, the offset is adjusted such that the position of the front passenger seat becomes closer to the middle position of the target lane than the position of the front passenger seat when the designated occupant of the front passenger seat is absent.

(Benefits)

In the vehicle control apparatus 1 configured as above, when the designated occupant is present, the offset is adjusted such that the lateral position of the own vehicle becomes closer to the middle position of the target lane than the lateral position of the own vehicle when the designated occupant is absent. During the automatic steering control, this can reduce discomfort or stress on the driver without making the designated occupant feel uncomfortable or stressed.

Referring to FIG. 3A, in the present embodiment, the lane detection section 301 of the controller 30 is responsible for the execution of step S110. The offset setting section 303 of the controller 30 is responsible for the execution of step S120. The occupant detection section 305 of the controller 30 is responsible for the execution of step S210. The offset adjustment section 307 of the controller 30 is responsible for the executions of steps 220, 230. The vehicle path estimation section 309 of the controller 30 is responsible for the execution of step S140. The automatic steering control section 311 of the controller 30 is responsible for the execution of step S150.

The surrounding detector 10 (in particular, the forward sensor 11) and the lane detection section 301 of the controller 30 constitute a lane detection unit. The occupant detector 20 and the occupant detection section 305 of the controller 30 constitute an occupant detection unit. The automatic steering controller 40 and the automatic steering control section 311 of the controller 30 constitute an automatic steering control unit. The offset setting section 303 of the controller 30 constitutes an offset setting unit. The offset adjustment section 307 of the controller 30 constitutes an offset adjustment unit. The vehicle path estimation section 309 of the controller 30 constitutes a vehicle-path estimation unit.

Second Embodiment

There will now be explained a second embodiment of the present invention. Only differences of the second embodiment from the first embodiment will be explained.

Figure 6A:
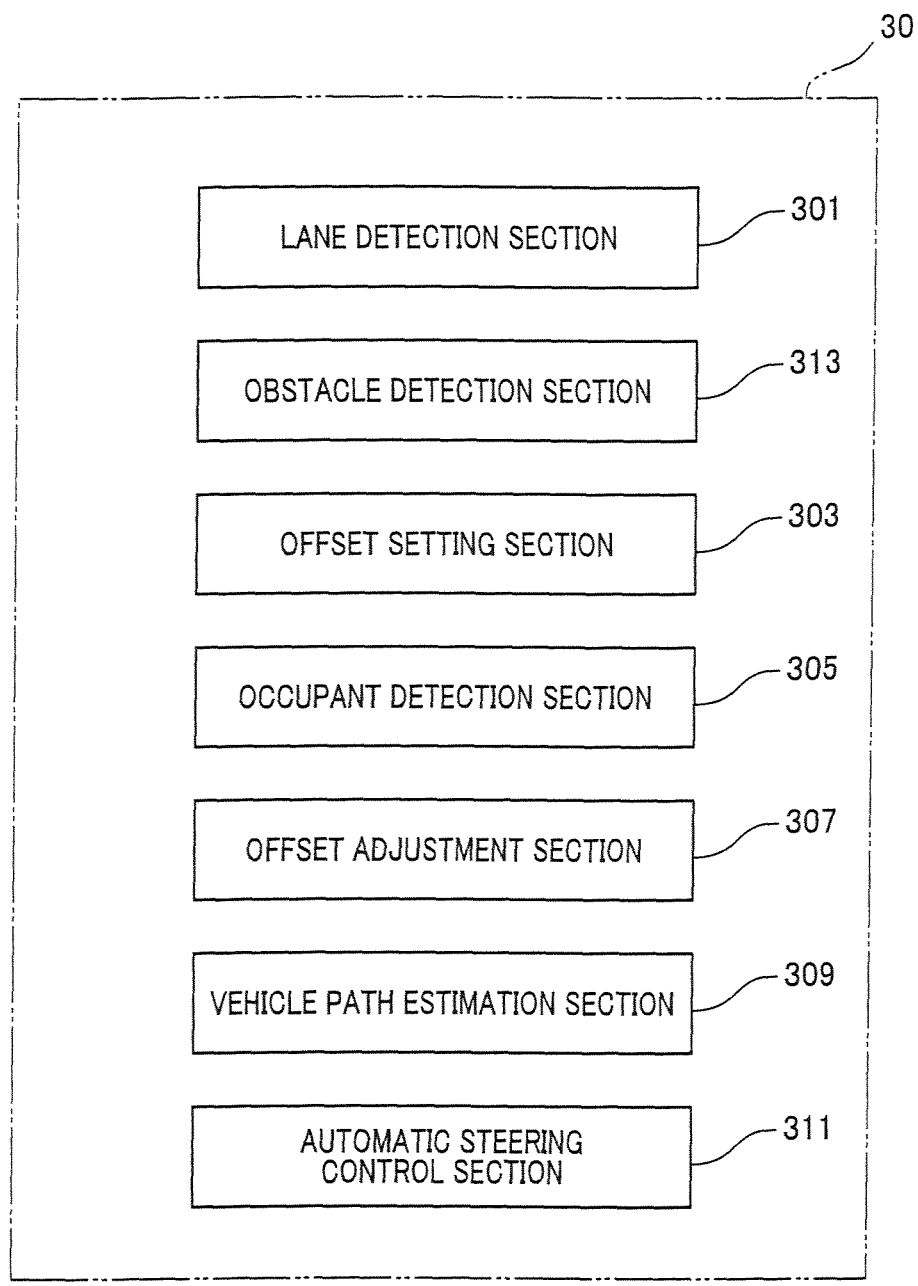
FIG. 6A shows a schematic diagram of a controller of the vehicle control apparatus of the second embodiment.

As shown in FIG. 6A, the controller 30 of the second embodiment is similar to the controller 30 of the first embodiment shown in FIG. 3A except that an obstacle detection section 313 is added to the controller 30 of the first embodiment.

(Lane Keeping Control)

As shown in FIG. 6B, steps S112, S114 are added and step S122 replaces step S120 as compared to the lane keeping control process of the first embodiment shown in FIG. 3B.

In step S112 subsequent to step S110, surroundings outside the target lane (hereinafter referred to as off-lane surroundings) are detected on the basis of the detection results of the left and right side sensors 12, 13.

More specifically, off-lane obstacles, such as lane partition protuberances, vehicles traveling side by side with the own vehicle, parked vehicles, terrains and constructions restricting the extent of the target lane, are detected in step S112. For each off-lane obstacle, target information including a position and a size (a height or a length along the lane) of the off-lane obstacle is acquired. An obstacle, a portion of which protrudes into the target lane, such as a parked vehicle, is also regarded as an off-lane obstacle.

Subsequently, in step S114, positions of the off-lane obstacles detected in step S112 relative to the own vehicle are detected.

In step S122, the offset is set on the basis of detection results of steps S110, S112, and S114.

More specifically, in the absence of off-lane obstacles in a predefined region (e.g., within a few tens of meters around the own vehicle), the offset is set as in step S120 of the first embodiment. In the presence of off-lane obstacles in the predefined region, the offset is set such that a position of the driver along the lane width direction is as close to the middle position of the target lane along the lane width direction as possible while at least a predetermined lateral distance (hereinafter referred to as a stress buffer distance) is ensured between each off-lane obstacle and the own vehicle. When the off-lane obstacles are on both sides of the target lane and the stress buffer distance cannot be ensured between each off-lane obstacle and the own vehicle, the offset is set such that the lateral position of the own vehicle is midway between the off-lane obstacles on both sides of the target lane. Preferably, a lateral distance between the own vehicle and the left-side off-lane obstacle laterally closest to the own vehicle is substantially equal to a lateral distance between the own vehicle and the right-side off-lane obstacle laterally closest to the own vehicle.

Subsequently, in step S130, in the absence of off-lane obstacles, the offset adjustment process is performed as in the first embodiment. In the presence of off-lane obstacles, the offset is adjusted so that the stress buffer distance is ensured between each off-lane obstacle and the lateral position of the own vehicle.

(Operations)

Figure 7A:
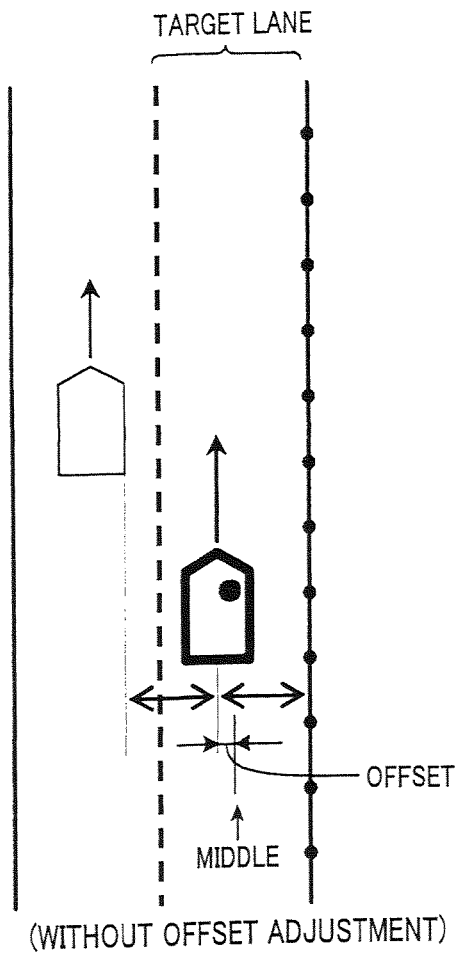
FIG. 7A shows an example of an offset in the absence of a designated occupant in accordance with the second embodiment.
Figure 7B:
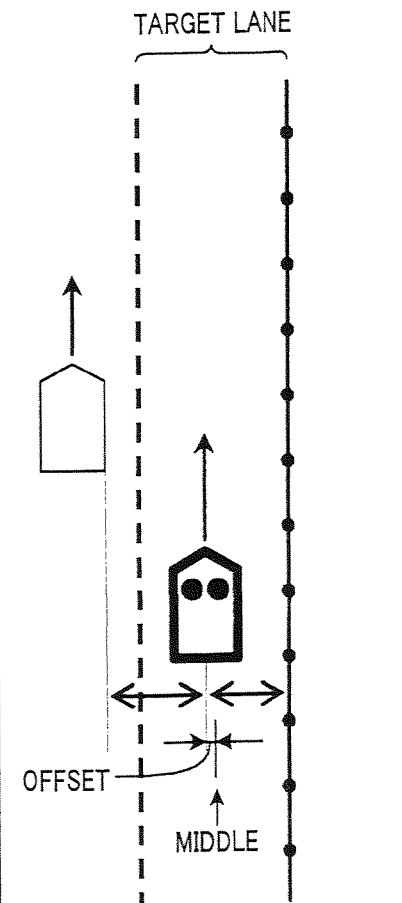
FIG. 7B shows an example of an offset in the presence of the designated occupant in accordance with the second embodiment.

FIG. 7A and FIG. 7B show a scenario where a lane separator (a sequence of protuberances) is on the right side of the target lane and a vehicle that is being overtaken by the own vehicle is traveling in a left adjacent lane. In the vehicle control apparatus 1 as configured as above, in the absence of the designated occupant in the own vehicle, the offset, as shown in FIG. 7A, is set such that the lateral position of the own vehicle is offset to the left relative to the middle position of the target lane, whereby the lateral position of the own vehicle is substantially midway between the vehicle being overtaken by the own vehicle and the lane separator. On the other hand, in the presence of the designated occupant in the own vehicle, the offset, as shown in FIG. 7B, is adjusted such that the lateral position of the own vehicle is displaced to the right (toward the driver) while at least the stress buffer distance is ensured between the lane separator and the own vehicle.

(Benefits)

This can properly achieve the automatic steering control depending not only on the vehicle occupancy of the own vehicle, but also on the off-lane surroundings, which can reliably reduce discomfort or stress on the occupants.

Referring to FIG. 6A, in the present embodiment, the obstacle detection section 313 of the controller 30 is responsible for the execution of step S112. The offset setting section 303 of the controller 30 is responsible for the executions of steps S114, S122.

The surrounding detector 10 (in particular, the left and right side sensors 12, 13) and the obstacle detection section 313 of the controller 30 constitute an obstacle detection unit.

Third Embodiment

There will now be explained a third embodiment of the present invention.

(Overall Configuration)

Figure 8:
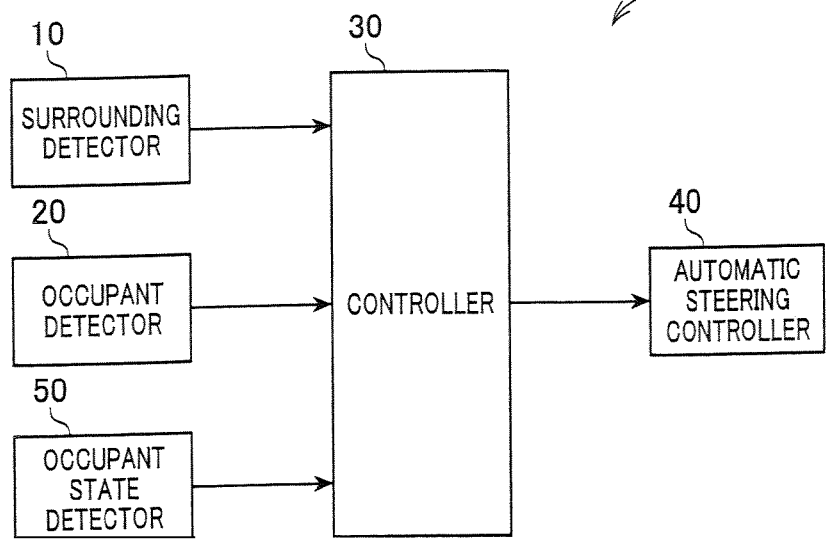
FIG. 8 shows a schematic block diagram of a vehicle control apparatus in accordance with a third embodiment of the present invention.

A vehicle control apparatus 2 in accordance with a third embodiment of the present embodiment, as shown in FIG. 8, includes an occupant state detector 50 comprised of an image sensor that captures images of the vicinity of a face of each occupant, in addition to the surrounding detector 10, the occupant detector 20, the controller 30, and the automatic steering controller 40.

Figure 9A:
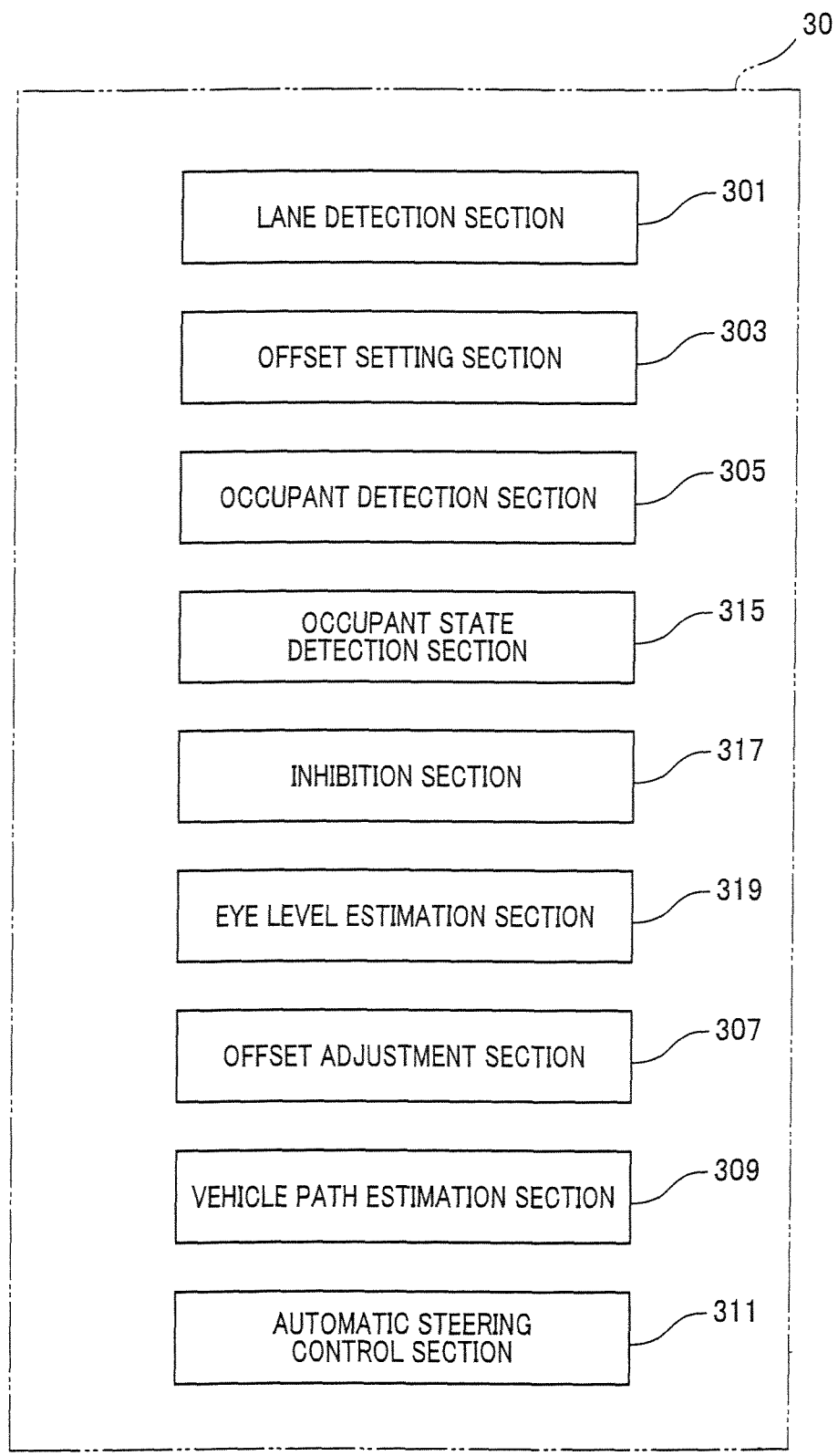
FIG. 9A shows a schematic diagram of a controller of the vehicle control apparatus of the third embodiment.

Only differences of the third embodiment from the first embodiment will be explained. As shown in FIG. 9A, the controller 30 of the third embodiment is similar to the controller 30 of the first embodiment shown in FIG. 3A except that an occupant state detection section 315, an inhibition section 317, and an eye level estimation section 319 are added to the controller 30 of the first embodiment.

(Offset Adjustment Process)

Figure 9B:
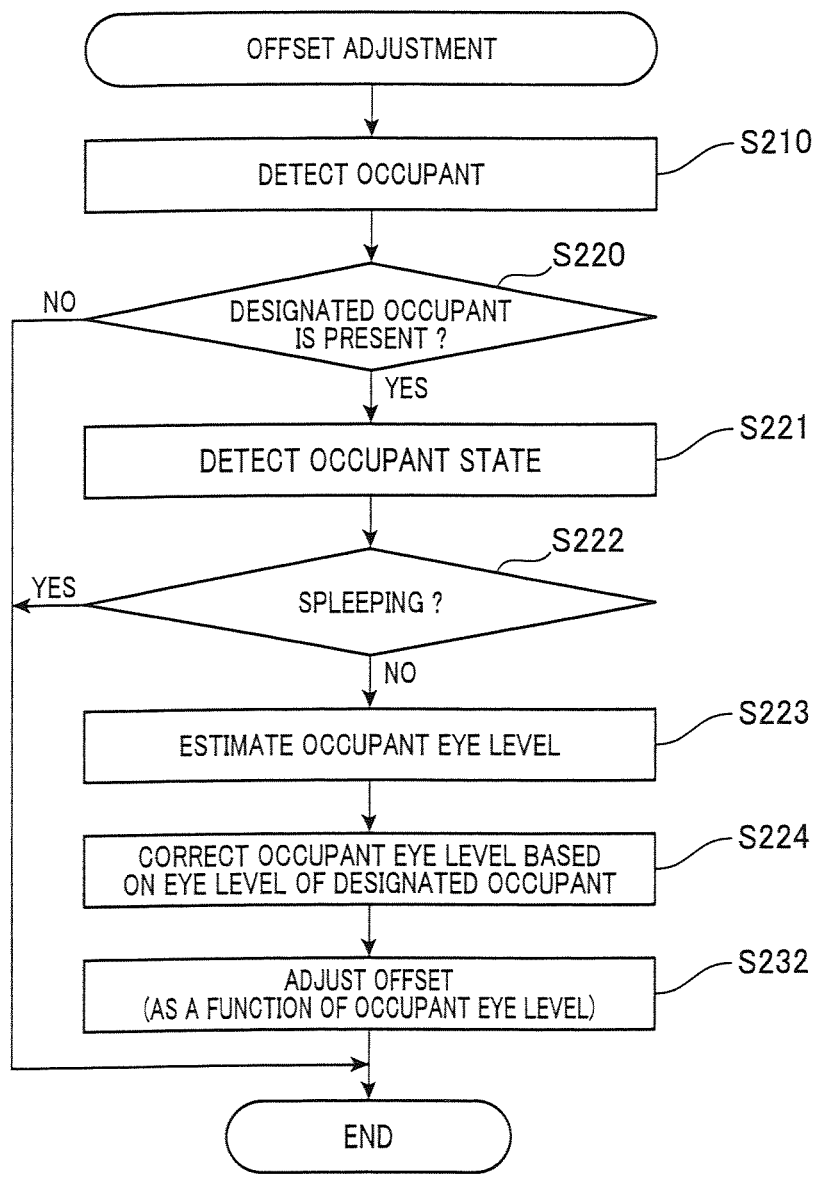
FIG. 9B shows a flowchart of a lane keeping control process of the third embodiment.

As shown in FIG. 9B, in the offset adjustment process of the present embodiment, steps S221 through S224 are added and step S232 replaces step S230 as compared to the offset adjustment process of the first embodiment shown in FIG. 4.

In step S220 subsequent to step 210, it is determined whether or not the designated occupant is present in the own vehicle. If the designated occupant is present in the own vehicle, then the process proceeds to step S221, where a state of the designated occupant is detected from the image of the vicinity of the face of the designated occupant detected by the occupant state detector 50. In the present embodiment, it is determined whether or not the designated occupant is sleeping.

If it is determined in step S222, from a detection result of step S221, that the designated occupant is sleeping, then the process is ended without adjusting the offset (i.e., activating the offset adjustment section 307).

On the other hand, if it is determined in step S222 that the designated occupant is not sleeping, then in step S223, an eye level of occupants (hereinafter referred to as an occupant eye level) is estimated from vehicle information (vehicle specification) about a height of the own vehicle. Subsequently, in step S224, an eye level (height position of an eye) of the designated occupant in the own vehicle is estimated from the image of the vicinity of the face of the designated occupant detected by the occupant state detector 50. A deviation of the detected eye level of the designated occupant from a standard eye level is acquired. The occupant eye level estimated in step S223 is then corrected by using the deviation.

Subsequently, in step S232, the offset is adjusted as a function of the occupant eye level acquired in steps S223, S224. More specifically, the offset is adjusted such that the lateral position of the own vehicle is displaced in a lateral direction toward the driver of the own vehicle by a lateral distance that is increased with a lowering eye level. That is, the offset is adjusted to be decreased with a lowering eye level. Thereafter, the process is ended.

Each occupant feels differently stressed as a function of his/her eye level, even though the off-lane surroundings are the same. In general, since the occupant is likely to feel more stressed as his/her eye level is lowered, the offset is adjusted accordingly.

(Benefits)

In the vehicle control apparatus 2 configured as above, even in the presence of the designated occupant, the offset is inhibited from being adjusted while the designated occupant is sleeping. This allows automatic steering control to be achieved properly depending on a state of the designated occupant.

In the vehicle control apparatus 2, the offset is adjusted as a function of the occupant eye level that may influence how the designated occupant feels stressed by the off-lane surroundings. This allows the automatic steering control to be achieved properly depending on the state of the designated occupant.

Referring to FIG. 9A, in the present embodiment, the occupant-state detection section 315 of the controller 30 is responsible for the execution of step S221. The inhibition section 317 of the controller 30 is responsible for the execution of step 222. The eye level estimation section 319 of the controller 30 is responsible of the executions of steps S223, S224. The offset adjustment section 307 of the controller 30 is responsible for the execution of step S232.

The occupant state detector 50 and the occupant-state detection section 315 of the controller 30 constitute an occupant-state detection unit. The inhibition section 317 of the controller 30 constitutes an inhibition unit. The occupant state detector 50 and the eye level estimation section 319 of the controller 30 constitute an eye level estimation unit.

(Modifications)

In the present embodiment, steps S221, S222 and steps S223, S224 are performed. Alternatively, steps S221, S222 or steps S223, S224 may be removed. When steps S223, S224 are removed, step S232 has to be replaced with step S230 of the first embodiment.

Still alternatively, only step S224 may be removed from the offset adjustment process shown in FIG. 9B, where the offset may be adjusted as a function of the occupant eye level estimated in step S223 without correcting the occupant eye level.

In the present embodiment, the occupant detector 20 is a separate component from the occupant state detector 50. Alternatively, the occupant state detector 50 may be integrated into the occupant detector 20, where the occupant detector 20 includes the image sensor to detect an occupant state.

Fourth Embodiment

There will now be explained a fourth embodiment of the present invention.

(Overall Configuration)

Figure 10:
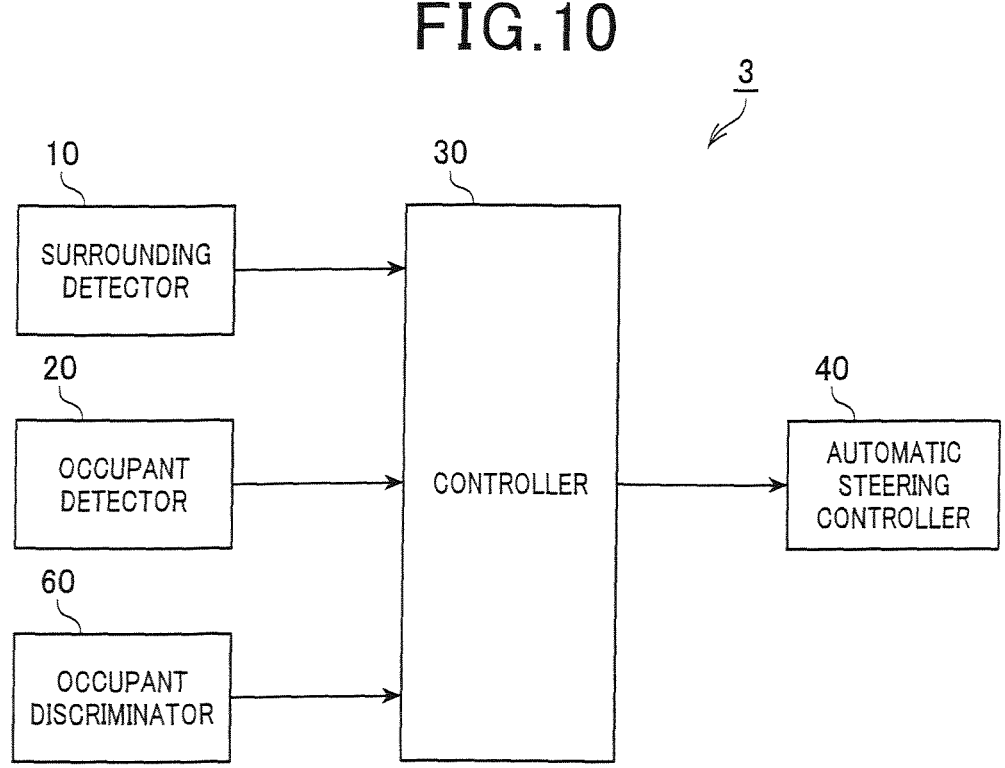
FIG. 10 shows a schematic block diagram of a vehicle control apparatus in accordance with a fourth embodiment of the present invention.

A vehicle control apparatus 3 in accordance with a fourth embodiment of the present embodiment, as shown in FIG. 10, includes an occupant discriminator 60 that determines whether or not the designated occupant is a predefined special occupant, in addition to the surrounding detector 10, the occupant detector 20, the controller 30, and the automatic steering controller 40.

The occupant discriminator 60, which may include a switch to be operated by the driver, determines that the designated occupant detected by the occupant detector 20 is the special occupant when the switch is operated by the driver. In some embodiments, the occupant discriminator 60 may be configured to acquire information for identifying a person from a cell-phone or an identification card, and determine from the acquired information that the designated occupant is the special occupant.

The special occupant, here, refers to an occupant who needs a special treatment taking into account special circumstances, such as a specific post (such as a chief executive, an executive or the like) and a specific age (an elderly person, a younger person or the like).

Only differences of the third embodiment from the first embodiment will be explained.

(Offset Adjustment Process)

As shown in FIG. 11B, step S225 is added and step S234 replaces step S230 as compared to the offset adjustment process of the first embodiment shown in FIG. 4.

In step S220 subsequent to step 210, it is determined whether or not the designated occupant is present in the own vehicle. If the designated occupant is present in the own vehicle, then the process proceeds to step S225, where it is determined whether or not the designated occupant is the special occupant from the detection result of the occupant discriminator 60.

Subsequently, in step S234, the offset is differently adjusted depending on whether or not the designated occupant is the special occupant. Thereafter, the process is ended. More specifically, when it is determined that the designated occupant is the special occupant, the offset is adjusted such that the lateral position of the own vehicle is displaced in a lateral direction toward the driver of the own vehicle by a greater distance than when it is determined that the designated occupant is not the special occupant. That is, the offset is adjusted to be decreased when it is determined that the designated occupant is the special occupant.

(Benefits)

As described above, in the vehicle control apparatus 3 configured as above, the offset is differently adjusted depending on whether or not the designated occupant is the special occupant. This allows the automatic steering control to be achieved properly depending on special circumstances of the designated occupant.

Figure 11A:
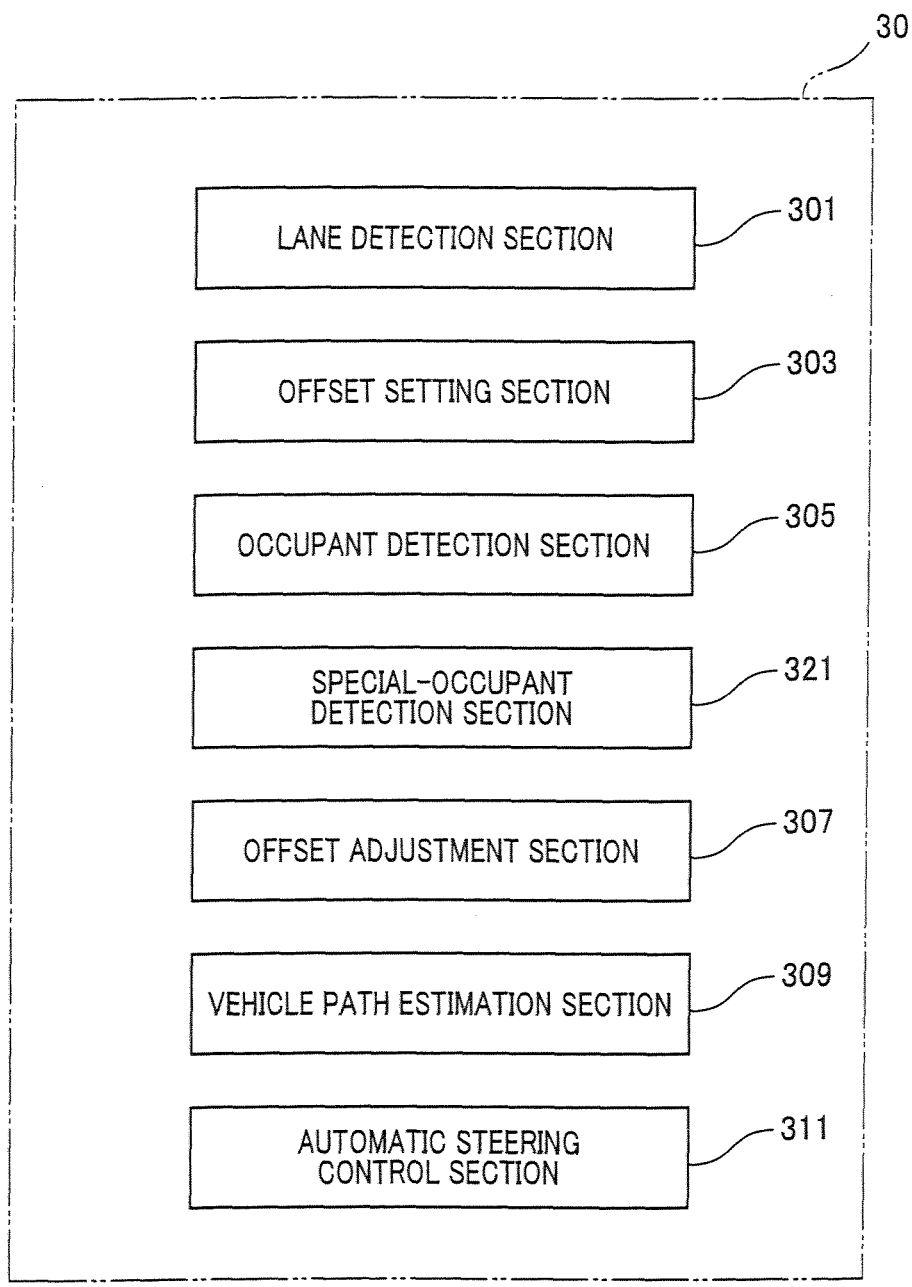
FIG. 11A shows a schematic diagram of a controller of the vehicle control apparatus of the fourth embodiment.

Referring to FIG. 11A, in the present embodiment, the special-occupant detection section 321 of the controller 30 is responsible for the execution of step S225. The offset adjustment section 307 of the controller 30 is responsible of the execution of step S234.

The occupant discriminator 60 and the special-occupant detection section 321 of the controller 30 constitute a special-occupant detection unit.

(Modifications)

In the present embodiment, the offset is differently adjusted depending on which one of two ranks (special occupant and non-special occupant) the designated occupant detected by the occupant detection section 305 is classified as. Alternatively, the offset may differently be adjusted depending on which one of three or more ranks the designated occupant detected by the occupant detection section 305 is classified as.

Alternatively, steps S221, S222 or steps S223, S224 or steps S221 through S224 of the third embodiment may be inserted between steps S220 and S225 of FIG. 11B. In particular, when steps 223, 224 are inserted between steps S220 and S225, the offset may differently be adjusted depending on the occupant eye level and whether or not the designated occupant is the special occupant.

Fifth Embodiment

There will now be explained a fifth embodiment of the present invention.

(Overall Configuration)

A vehicle control apparatus 4 in accordance with a fifth embodiment of the present embodiment, as shown in FIG. 12, includes a status indicator 80 that makes offset setting information and the like known to the occupants and an instruction input 70 that receives instructions from the occupants, in addition to the surrounding detector 10, the occupant detector 20, the controller 30, and the automatic steering controller 40.

The status indicator 80 includes, but not limited to, a speaker, a display, an illuminator, such as a light-emitting diode (LED), or a motor, to indicate current settings via sound, light (images), vibrations or the like. The instruction input 70 includes, but not limited to, a switch positioned for the occupants to operate.

The fifth embodiment differs in the lane keeping control process from the first embodiment. Only differences of the fifth embodiment from the first embodiment will be explained.

(Lane Keeping Control)

As shown in FIG. 13B, steps S142, S144 are added as compared to the lane keeping control process of the first embodiment shown in FIG. 3B.

Referring to FIG. 13B, in step S142 subsequent to step S140, at least one of an offset adjustment result of step S130 and a vehicle path estimation of step S140 is indicated to the occupants via the status indicator 80.

Subsequently, in step S144, it is determined whether or not the estimated vehicle path or the adjusted offset is employed, thereby confirming an occupant's intention. More specifically, a notification is provided to each occupant for prompting the occupant to input an instruction to employ the estimated vehicle path or the adjusted offset or an instruction to employ neither the estimated vehicle path nor the adjusted offset. If the instruction to employ the estimated vehicle path or the adjusted offset is received from at least one of the occupants via the instruction input 70 within a predetermined time period or if the predetermined time period has elapsed without receiving instructions, the estimated vehicle path or the adjusted offset is employed. If the instruction to employ neither the estimated vehicle path nor the adjusted offset is received from at least one of the occupants within the predetermined time period, a vehicle path estimated on the basis the offset set in step S120 (the offset prior to adjustment) is employed.

In step S150, the automatic steering control is performed according to the vehicle path employed in step S144. Thereafter, the process is ended.

(Benefits)

In the vehicle control apparatus 4 described above, the offset is changed only when at least one of the occupants intends to employ the adjusted offset (and thus the vehicle path estimated on the basis of the adjusted offset). This can prevent unintended steering control from being performed.

Figure 13A:
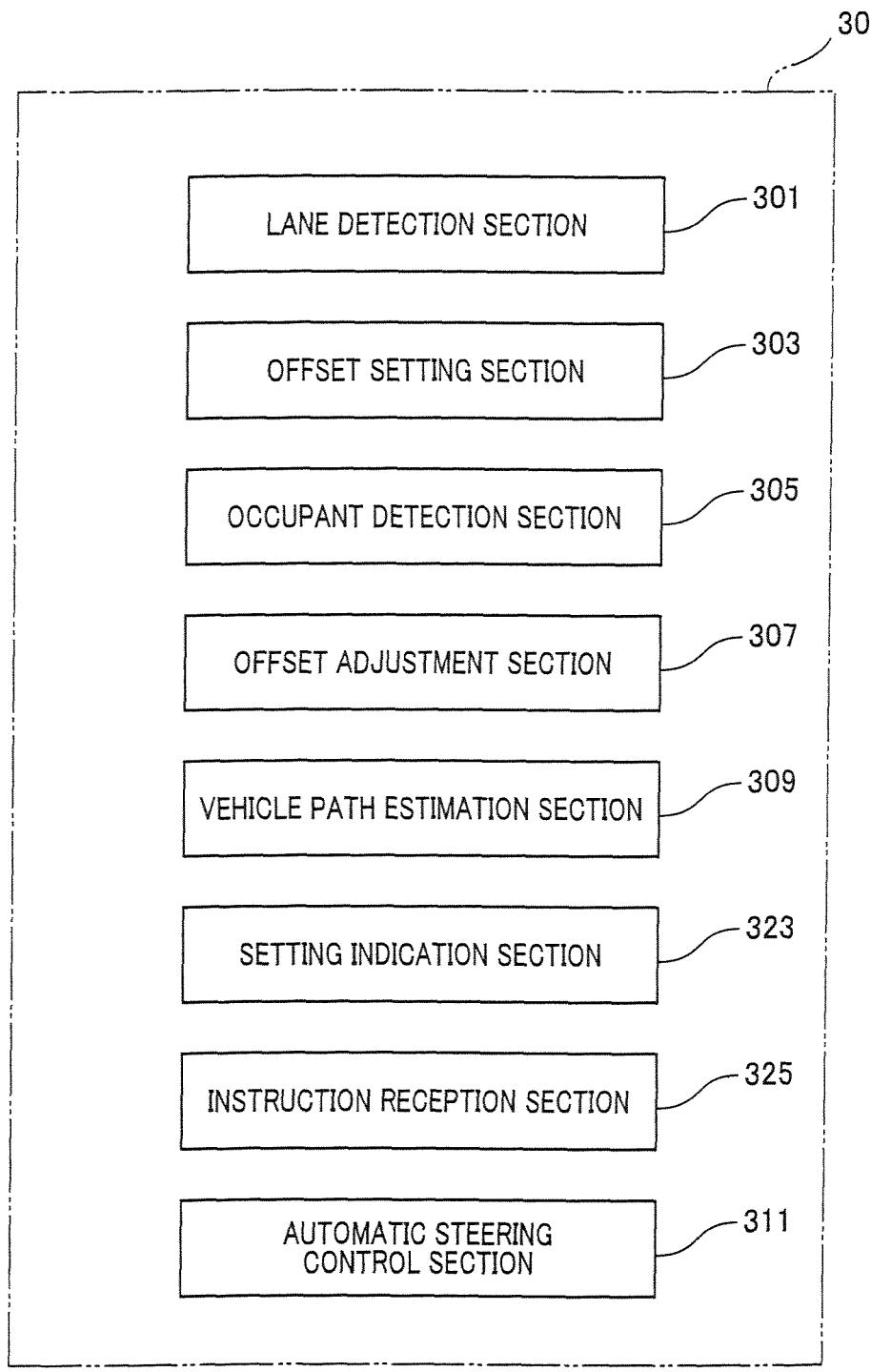
FIG. 13A shows a schematic diagram of a controller of the vehicle control apparatus of the fifth embodiment.

Referring to FIG. 13A, in the present embodiment, the status indication section 323 of the controller 30 is responsible for the execution of step S142. The instruction reception section 325 of the controller 30 is responsible of the execution of step S144.

The status indicator 80 and the status indication section 323 of the controller 30 constitute a status indication unit. The instruction input 70 and the instruction reception section 325 of the controller 30 constitute an instruction reception unit.

(Modifications)

In the present embodiment, the status indication step (S142) and the intention confirmation step (S144) are added to the lane keeping process of the first embodiment (see the flowchart of FIG. 3). Alternatively, step S142 and step S144 may be added to the lane keeping process of the second embodiment (see the flowchart of FIG. 6B). Still alternatively, only either one of step S142 and step S144 may be removed from the lane keeping process of the fifth embodiment. For example, only step S144 may be removed from the lane keeping process of the fifth embodiment.

Other Embodiments

There will now be explained some other embodiments that may be devised without departing from the spirit and scope of the present invention.

In the above described embodiments, the occupant of the front passenger seat is the designated occupant. Alternatively, occupants of all the seats (including the front passenger seat) opposite the driver's seat in relation to the middle position of the own vehicle along the vehicle width direction may be designated occupants, where in the presence of at least one of the designated occupants the offset may be adjusted.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A vehicle control apparatus mounted in a vehicle, the apparatus comprising:
    a lane detection unit that detects a lane in which the vehicle is driven to travel;
    an offset setting unit that sets an offset suitable for making a driver of the vehicle feel less stressed, the offset being a deviation of a lateral position of the vehicle from the middle position of the lane along the lane width direction, the lateral position of the vehicle being the middle position of the vehicle along the vehicle width direction;
    an occupant detection unit that detects the presence of a designated occupant in the vehicle other than the driver, the designated occupant being an occupant sitting in a seat laterally opposite a driver's seat;
    an offset adjustment unit that, when the designated occupant is detected by the occupant detection unit, adjusts the offset set by the offset setting unit such that the lateral position of the vehicle is displaced toward the driver in the lane width direction, in order to make the designated occupant feel less stressed, the offset set by the offset setting unit being set assuming that the designated occupant is absent;
    a vehicle-path estimation unit that estimates a vehicle path in the lane such that the vehicle can travel along the vehicle path from a current lateral position to a target lateral position of the vehicle, the target lateral position of the vehicle being a lateral position offset from the middle position of the lane by the offset set by the offset setting unit or by the offset adjusted by the offset adjustment unit; and
    an automatic steering control unit that automatically controls steering so that the vehicle travels along the vehicle path estimated by the vehicle-path estimation unit.

2. The apparatus of claim 1, wherein the seat laterally opposite the driver's seat is a front passenger seat of the vehicle.

3. The apparatus of claim 2, wherein
    the offset setting unit is configured to set the offset such that a position of the driver along the lane width direction is as close to the middle position of the lane along the lane width direction as possible while a minimum required space is ensured between the vehicle and a front passenger seat side lane demarcation.

4. The apparatus of claim 1, further comprising:
    an occupant-state detection unit that determines whether or not the designated occupant is sleeping; and
    an inhibition unit that, when it is determined by the occupant-state detection unit that the designated occupant is sleeping, inhibits the offset adjustment unit from adjusting the offset set by the offset setting unit.

5. The apparatus of claim 1, further comprising an eye level estimation unit that estimates an eye level of occupants of the vehicle from vehicle information about a height of the vehicle, wherein the offset adjustment unit adjusts the offset set by the offset setting unit such that the lateral position of the vehicle is displaced toward the driver in the lane width direction by an increasing amount of lateral distance with a lowering eye level estimated by the eye level estimation unit.

6. The apparatus of claim 1, further comprising a special-occupant detection unit that determines whether or not the designated occupant is a predetermined special occupant, wherein the offset adjustment unit is configured to, when it is determined by the special-occupant detection unit that the designated occupant is the predetermined special occupant, adjust the offset set by the offset setting unit such that the lateral position of the vehicle is displaced toward the driver in the lane width direction by an increased amount of lateral distance as compared to cases where the designated occupant is not the predetermined special occupant.

7. The apparatus of claim 1, further comprising an obstacle detection unit that detects an off-lane obstacle, the off-lane obstacle being an obstacle outside the lane, wherein the offset setting unit is configured to set the offset in response to a detection result of the obstacle detection unit.

8. The apparatus of claim 7, wherein the offset setting unit is configured to, in the presence of the off-lane obstacle in a predefined region around the vehicle, set the offset such that a position of the driver along the lane width direction is as close to the middle position of the lane along the lane width direction as possible while at least a predetermined lateral distance is ensured between the off-lane obstacle and the vehicle.

9. The apparatus of claim 1, further comprising a status indication unit that indicates to occupants of the vehicle at least one of an offset adjustment result of the offset adjustment unit and a vehicle path estimation of the vehicle-path estimation unit.

10. The apparatus of claim 1, further comprising an instruction reception unit that receives an instruction of whether to employ an offset adjustment result of the offset adjustment unit, wherein the vehicle-path estimation unit is configured to estimate the vehicle path based on the offset set by the offset setting unit or the offset adjusted by the offset adjustment unit in accordance with the instruction received via the instruction reception unit.

11. The apparatus of claim 1, wherein when the occupant detection unit does not detect the presence of the designated occupant in the vehicle, the offset adjustment unit adjusts the offset set by the offset setting unit such that the driver is positioned in a vicinity of the middle position of the lane.

12. The apparatus of claim 11, wherein when the occupant detection unit detects the presence of the designated occupant in the vehicle, the offset adjustment unit adjusts the offset set by the offset setting unit such that the seat laterally opposed to the driver's seat is at a location closer to the middle position of the lane than a location of the seat laterally opposed to the driver's seat when the designated occupant is not detected.

13. The apparatus of claim 1, wherein when the occupant detection unit detects the presence of the designated occupant in the vehicle, the offset adjustment unit adjusts the offset set by the offset selling unit such that the seat laterally opposed to the driver's seat is at a location closer to the middle position of the lane than a location of the seat laterally opposed to the driver's seat when the designated occupant is not detected.

* * * * *

UNITED STATES PATENT AND TRADEMARK OFFICE
CERTIFICATE OF CORRECTION

Page 1 of 1

PATENT NO. : 9,043,092 B2
APPLICATION NO. : 13/777037
DATED : May 26, 2015
INVENTOR(S) : Yusuke Ueda et al.

It is certified that error appears in the above-identified patent and that said Letters Patent is hereby corrected as shown below:

In the Claims

Column 14, line 32, claim 13, delete "selling" and insert --setting--.

Signed and Sealed this
Seventeenth Day of November, 2015

Michelle K. Lee
*Director of the United States Patent and Trademark Office*